United States Patent [19]

Delmer

[11] Patent Number: 5,118,042
[45] Date of Patent: Jun. 2, 1992

[54] MULTIPLE CHAMBER DRIP IRRIGATION HOSE

[75] Inventor: Daniel W. C. Delmer, 17044 Bluewater La., Huntington Beach, Calif. 92649

[73] Assignees: William A. Delmer; Robert J. Delmer; Daniel W. C. Delmer, all of Huntington Beach, Calif.

[21] Appl. No.: 787,737

[22] Filed: Nov. 4, 1991

Related U.S. Application Data

[63] Continuation of Ser. No. 659,446, Feb. 22, 1991, abandoned, which is a continuation of Ser. No. 371,101, Jun. 26, 1989, abandoned.

[51] Int. Cl.⁵ .................................. B05B 15/00
[52] U.S. Cl. ............................................ 239/542
[58] Field of Search ......................... 239/450, 542

[56] References Cited

U.S. PATENT DOCUMENTS

| | | |
|---|---|---|
| 2,798,768 | 7/1957 | Babin . |
| 3,008,862 | 11/1961 | Haine et al. . |
| 3,467,142 | 9/1969 | Boyle et al. . |
| 3,774,850 | 11/1973 | Zeman ............... 239/542 |
| 3,779,468 | 12/1973 | Spencer ............. 239/542 |
| 3,870,236 | 3/1975 | Barragan ............ 239/542 |
| 3,873,030 | 3/1975 | Barragan ............ 239/542 |
| 3,896,999 | 7/1975 | Barragan .......... 239/542 X |
| 3,903,929 | 9/1975 | Mock ................. 138/115 |
| 4,009,832 | 3/1977 | Tiedt ................. 239/542 |
| 4,047,995 | 9/1977 | Diaz ............... 239/542 X |
| 4,177,946 | 12/1979 | Barragan ......... 239/542 X |
| 4,196,853 | 4/1980 | Delmer .............. 239/116 |
| 4,247,051 | 1/1981 | Allport .............. 239/542 |
| 4,354,639 | 10/1982 | Delmer ............... 239/542 |
| 4,430,020 | 2/1984 | Robbins .......... 239/542 X |
| 4,534,515 | 8/1985 | Chapin ............... 239/542 |
| 4,548,360 | 10/1985 | Delmer et al. ....... 239/542 |
| 4,572,756 | 2/1986 | Chapin ............... 156/203 |
| 4,626,130 | 12/1986 | Chapin ........... 239/542 X |
| 4,642,152 | 2/1987 | Chapin ............... 156/203 |
| 4,655,397 | 4/1987 | Gorney ............... 239/542 |

Primary Examiner—Andres Kashnikow
Assistant Examiner—William Grant
Attorney, Agent, or Firm—Harris, Kern, Wallen & Tinsley

[57] ABSTRACT

A multiple chamber hose for drip irrigation and the like, with a primary chamber for fluid flow therethrough and a multiple layer section having a primary layer, a mid layer and a secondary layer, and with a secondary chamber in the mid layer for fluid flow therethrough. The primary layer is positioned between the primary chamber and the mid layer, and the secondary layer is positioned between the mid layer and the exterior. The hose includes an inlet opening for fluid flow from the primary chamber to the secondary chamber and an outlet opening for fluid flow from the secondary chamber to the exterior.

21 Claims, 6 Drawing Sheets

MULTIPLE CHAMBER DRIP IRRIGATION HOSE

This application is a continuation of application Ser. No. 659,446, filed Feb. 22, 1991, now abandoned, which is a continuation of application Ser. No. 371,101, filed Jun. 26, 1989, now abandoned.

BACKGROUND OF THE INVENTION

This invention relates to a multiple chamber hose suitable for drip irrigation and the like, and to a method of making such a hose.

Drip irrigation hose has been formed from continuous plastic strips for a considerable period of time, and there is a wide range of prior patents in the field. The most pertinent of these known to applicants are listed in the attached Information Disclosure Statement.

The various prior art hoses operate in the same general manner. A primary chamber is connected to the water supply, and the pressure in the primary chamber is relatively high. Some form of flow restriction devices are incorporated in or added to the hose for distributing water at spaced locations along the hose at a substantially reduced pressure. One problem in the manufacture and use of such hose is achieving and maintaining a desired stable low rate of flow from the restriction devices. Such irrigation hose is manufactured in rolls and is installed in very long lengths, with typical roll lengths in the range of 3,000 to 15,000 feet. Uniformity in the construction of the restriction device over thousands and thousands of feet of hose at high speeds has been difficult.

Another problem encountered with irrigation hose is the cost of manufacture, since large quantities of the hose are utilized and typically must be replaced every growing season. Therefore a design and method of manufacture which permits high speed production while at the same time maintaining precise control of the restriction devices is highly desirable.

Accordingly, it is an object of the present invention to provide a new and improved multiple chamber hose and a method of making such a hose which is less expensive, more accurate, and more reliable than present hose.

Another problem with many present manufacturing methods is that they require molding of plastic to establish the restricted flow paths. This usually is performed by melting plastic resins and forming the entire tube or by forming the secondary flow path from molten plastic and adding it to the cured plastic film while still in a semi-moltent stage. The cured film forms the main body of the tube. See for example the U.S. Pat. Nos. 4,534,515 and 4,572,756 to Chapin, and Mock U.S. Pat. No. 3,903,929. The above mentioned techniques are limited in rate of production due to the molten nature of the material and the necessary cure time. Uniformity of the restricting secondary chamber is an important consideration in hose manufacture because of its effect on uniform flow rates desired for the finished product in the field. In contrast the precision die cutting of the secondary chamber in the present invention provides exact repeatability with high rates of production. Further, deformation of the tube forming material with its accompanying uniformity problems is not required.

Other objects, advantages, features and results will more fully appear in the course of the description.

SUMMARY OF THE INVENTION

A multiple chamber hose for drip irrigation and the like having a primary chamber for fluid flow therethrough and a multiple layer section with a primary layer, a mid layer and a secondary layer and with a secondary chamber in the mid layer for fluid flow therethrough. The primary layer is positioned between the primary chamber and the mid layer, and the secondary layer is positioned between the mid layer and the exterior. The hose includes an inlet opening for fluid flow from the primary chamber to the secondary chamber and an outlet opening for fluid flow from the secondary chamber to the exterior. Methods of making such a hose.

A feature of the invention is the provision of the restriction device as a secondary chamber which can be cut in the material in a precision manner. A further feature is the method of manufacture utilizing a continuous strip or, in one embodiment, two continuous strips, including the steps of cutting, glueing, folding and pressing, all in a continuous high speed operation.

The multiple layer section and the secondary chamber may have various configurations, including those specific embodiments hereinafter disclosed.

BRIEF DESCRIPTION OF THE DRAWINGS

FIG. 10 is a view similar to that of FIG. 4 showing another embodiment of the cutting of a strip of material prior to folding in;

DESCRIPTION OF THE PREFERRED EMBODIMENTS

The presently preferred embodiment of a hose 31 is shown in FIGS. 1-4. The hose is made from a single strip 32 of a waterproof material, typically a plastic such as polyethylene. The hose has a primary chamber 33 and a plurality of secondary chambers 34. The hose includes a multiple layer section comprising a primary layer 35, a mid layer 36 in an edge portion 36a, and a secondary layer 37 in an edge portion 37a. Each of the secondary chambers 34 has a chamber inlet 38 and a chamber outlet 39. Inlet openings 40 are provided in the primary layer 35 and outlet openings 41 are provided in the secondary layer 37. The strip 32 has opposing edges 42, 43.

Figure 2:
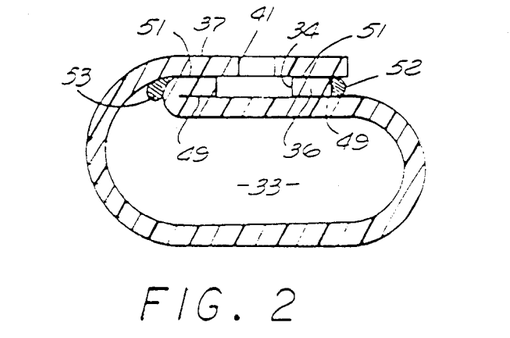
FIGS. 2 and 3 are enlarged sectional views taken along the lines 2—2 and 3—3 of FIG. 1, respectively.
Figure 3:
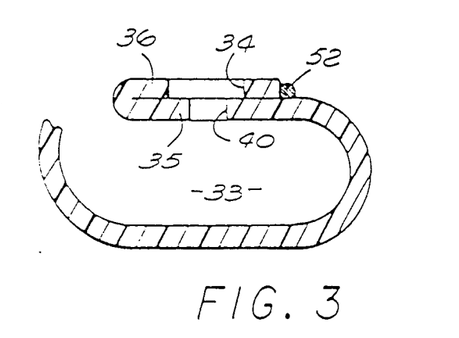
Figure 4:
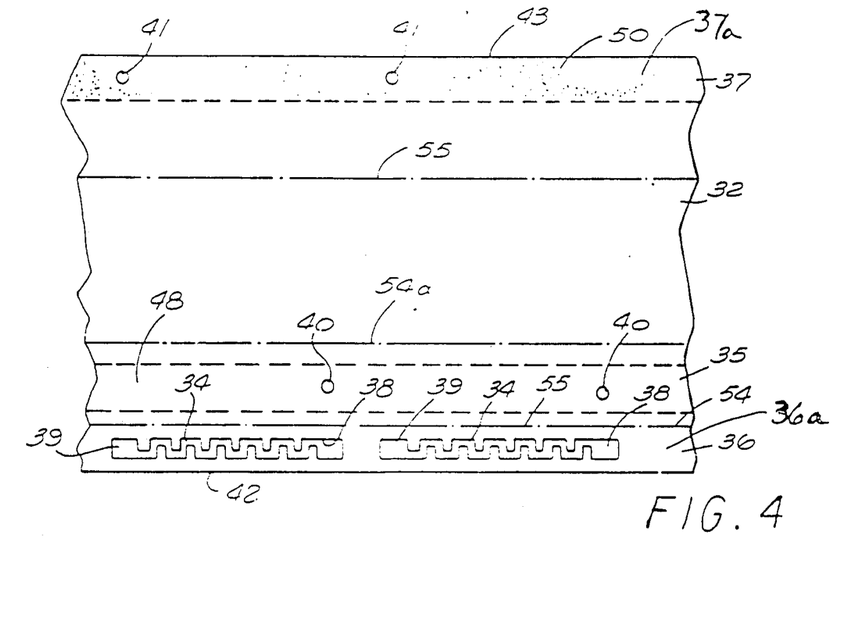
FIG. 4 is a plan view of a strip of the material used for forming the hose of FIG. 1, and illustrating the openings formed in the strip of material prior to folding.

Long lengths of the hose may be formed from the strip 32 in a continuous operation. The secondary chambers 34 and the openings 40, 41 are die cut or otherwise formed in the strip. Alternative methods of cutting include laser cutting and heat cutting. Next an adhesive is applied to the underside of the strip at the primary layer 35, typically in the zone 48 defined by the dashed lines, and the edge 42 with the mid layer 36 is folded under and bonded to the primary layer 35 by the adhesive. This adhesive layer is shown by the heavy line 49 in FIG. 2. Another layer of adhesive is applied on the secondary layer 37, typically in the zone 50 defined by the edge 43 and the dashed line. The strip is folded to bring the secondary layer 37 into engagement with the mid layer 36, as shown in FIG. 2. This adhesive layer is shown by the heavy line 51 in FIG. 2. If desired, a bead of adhesive 52 may be applied between the primary layer and the secondary layer, and a bead of adhesive 53 may be applied between the mid layer and the secondary layer for additional strength. Also, heat sealing may be utilized in place of adhesive bonding if desired. Vibration or sonic bonding also is a method of bonding plastic material.

Figure 1:
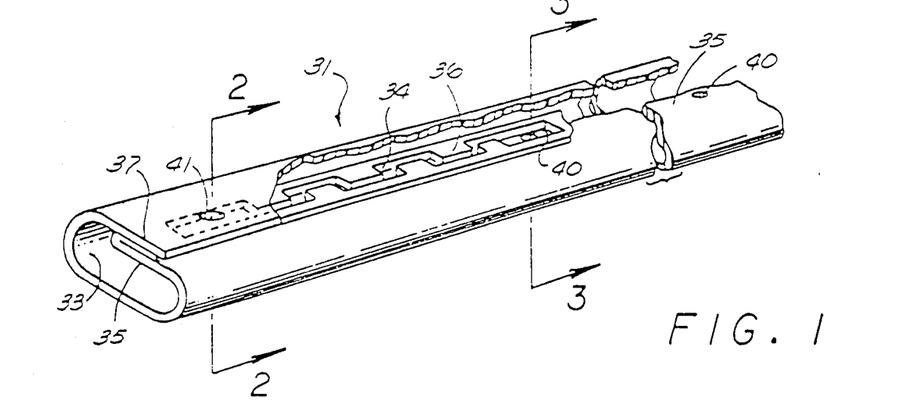
FIG. 1 is a perspective view of a length of multiple chamber hose, partly broken away, and showing the presently preferred embodiment of the invention.

Typically during the folding and bonding operations, the hose passes between rollers which produce a substantially flat structure, with the fold lines indicated by the phantom lines 54, 54a and 55 in FIG. 4. However when the primary chamber 33 is filled with water under moderate pressure, the hose assumes a shape substantially as shown in FIGS. 1 and 2, with the actual shape depending upon the water pressure. With higher pressure, the hose is more nearly circular.

In operation, a water supply is connected to the primary chamber 33 at one end of a length of a hose, with the other end of the hose clamped shut. Water flows from the primary chamber through the inlet openings 40 into the chamber inlets of the secondary chambers.

The secondary chambers typically are serpentine, and provide restricted flow between the chamber inlet and the chamber outlet, and water flows from the secondary chamber through the outlet openings to the exterior of the hose at a relatively slow rate. The rate of flow is determined by the dimensions of the hose, including the size and shape of the secondary chambers, and by the pressure in the primary chamber. The secondary chambers may take various shapes, and several forms are disclosed. In the embodiment of FIGS. 1-4, the secondary chambers have a square wave configuration.

With the construction of the present invention, the secondary chambers may be precisely cut so that they provide uniform flow from each of the outlet openings, while operating at high production rate. Also, the secondary chamber may be configured to provide compensation for variations in supply pressure and maintain a substantially uniform output flow rate.

Figure 5:
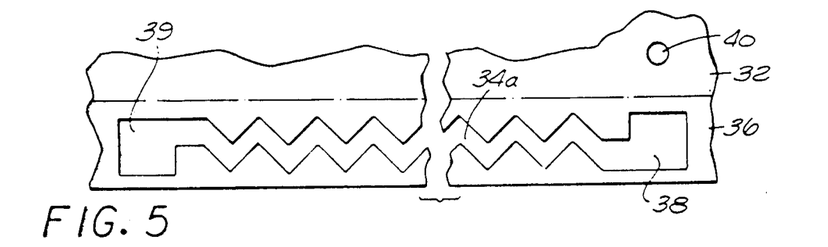
FIG. 5 is an enlarged partial view similar to that of FIG. 4 showing an alternate configuration for the secondary chamber.

An alternative shape for the secondary chamber is shown in FIG. 5 with a saw tooth pattern 34a.

Figure 6:
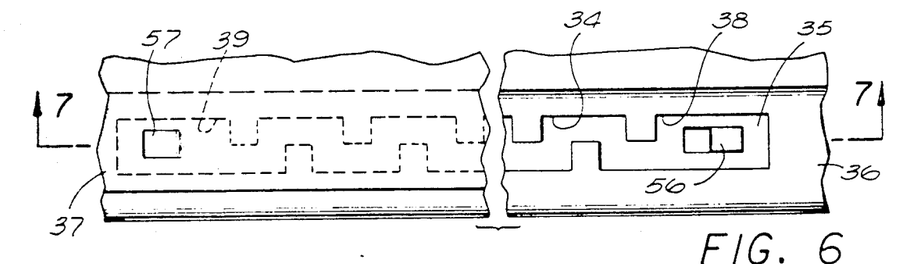
FIG. 6 is a top view of a portion of a length of hose showing another alternative embodiment with flaps.
Figure 7:
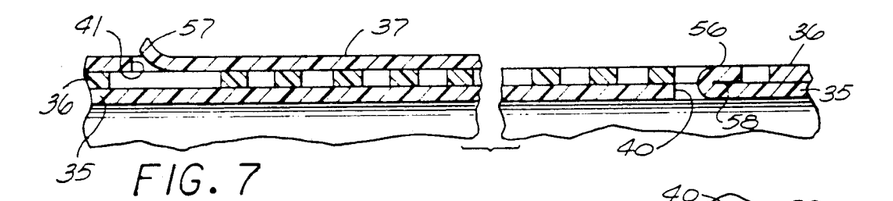
FIG. 7 is a partial sectional view taken along the line 7—7 of FIG. 6.

Another alternative construction is shown in FIGS. 6 and 7, with a flap 56 in the primary layer 35 to provide the inlet opening 40 and with a flap 57 in the secondary layer 37 to provide the outlet opening 41. Typically the openings at 40, 41 will be produced by punching, while the flaps 56, 57 will be produced by lancing. In the preferred embodiment, the flaps 56 will be bonded to the primary layer 35 by an adhesive at 58, while the flaps 57 will be free. Use of the flap 57 at the outlet opening provides protection for the secondary chamber when the hose is not pressurized. The use of flaps eliminates the requirement of removing the material punched out for the openings 40, 41.

Figure 8:
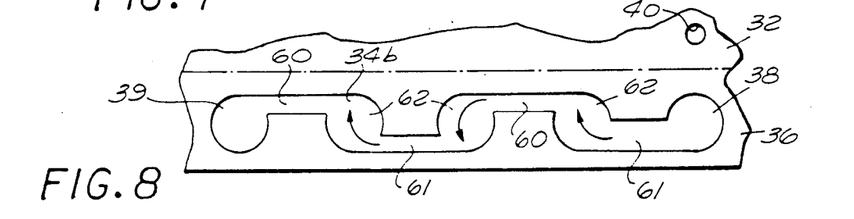
FIG. 8 is a view similar to that of FIG. 5 showing another alternative embodiment of the invention.

Another shape for the secondary chamber is shown in FIG. 8, with the chamber 34b formed of alternating offset sections 60, 61, with the offset sections joined by circular sections 62. With this configuration, additional turbulent flow is obtained in the circular sections, thereby obtaining increased flow restriction in a lesser distance. This embodiment is especially suited for input pressure compensation.

Figure 9:
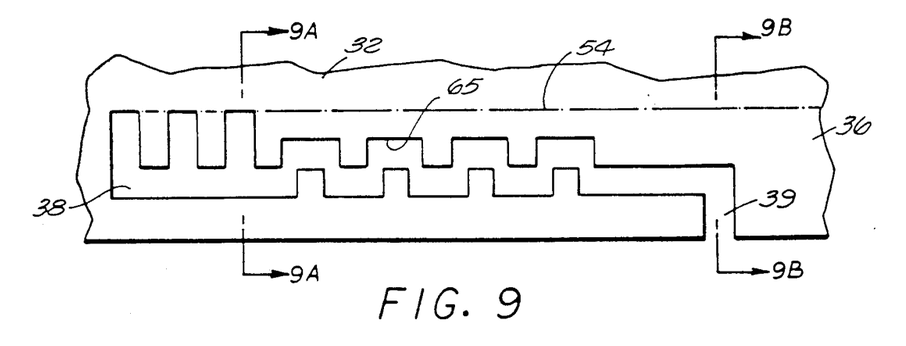
FIG. 9 is another view similar to that of FIGS. 5 and 8 showing another alternative embodiment.
Figure 9A:
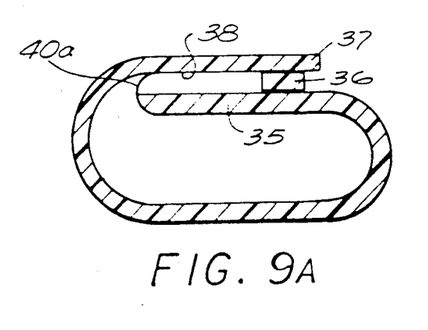
FIGS. 9A and 9B are partial sectional views of a hose produced with the strip of FIG. 9 and illustrating the operation of the secondary chambers.
Figure 9B:
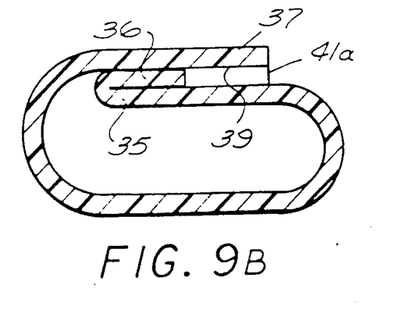

Another alternative form for the secondary chamber is shown as 65 in FIGS. 9, 9A and 9B. In this embodiment, the inlet chamber 38 extends to the fold line 54 and the outlet chamber 39 extends to the edge 42 of the strip. Then when the strip is folded to form the hose, the open edge of the chamber 38 serves as the inlet opening or openings 40a and the open edge of the chamber 39 serves as the outlet opening or openings 41a. The sectional FIGS. 9A and 9B are of a finished hose while FIG. 9 is of the film prior to folding. The section lines on FIG. 9 are used to show where the sections are taken of the finished hose.

Figure 10:
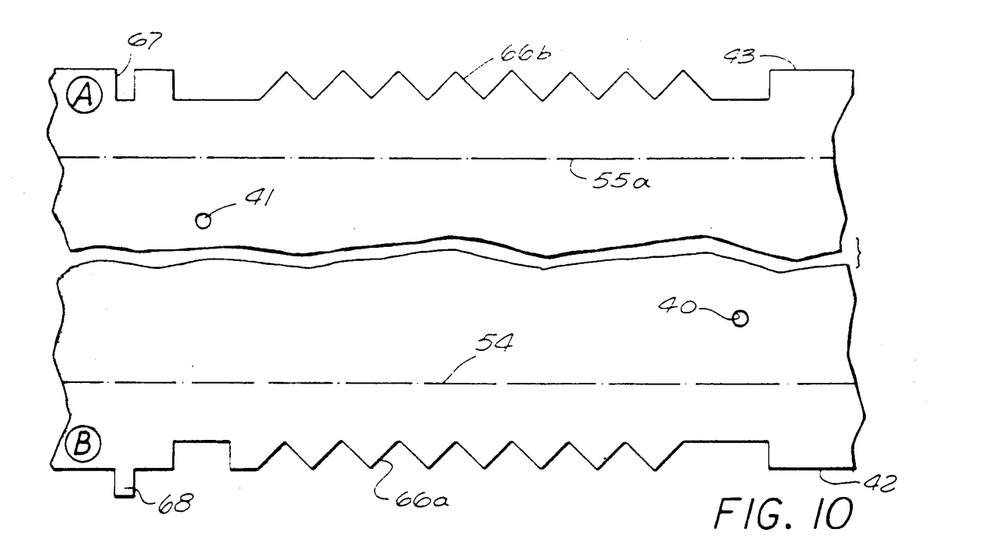
Figure 11:
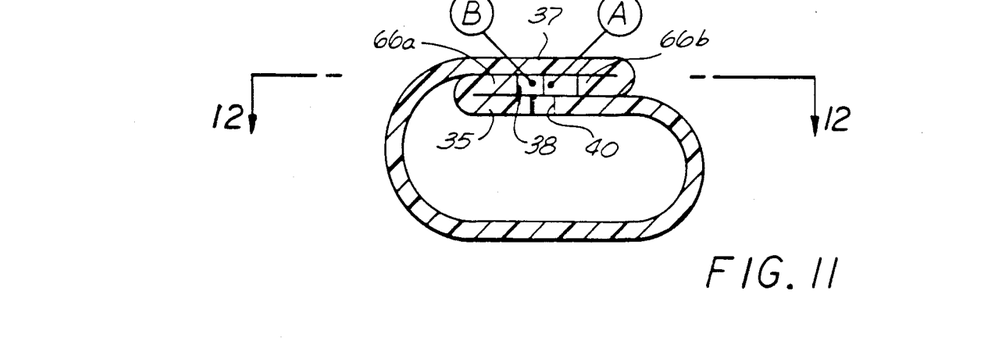
FIG. 11 is a cross sectional view of the hose formed from the strip of FIG. 10.
Figure 12:
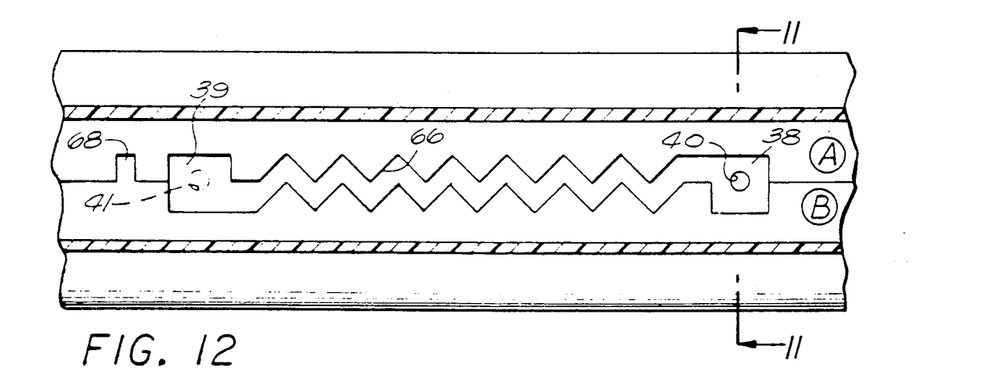
FIG. 12 is a sectional view taken along the line 12—12 of FIG. 11.

Another alternative embodiment is shown in FIGS. 10-12 with the secondary chamber 66 being formed by cut outs 66a at edge 42 and cut outs 66b at edge 43. The edge 42 is folded back on itself at line 54 and cemented in place, and the edge 43 is folded back on itself at line 55a and cemented in place, as shown in FIG. 11. Preferably, a registration notch 67 is formed in one edge and a registration flap 68 is formed in the other edge, with the flap being positioned in the notch on folding, as shown in FIG. 12 for maintaining alignment of the cut outs 66a, 66b to form the secondary chamber 66. This embodiment can be used in reducing waste when several hoses are being produced in parallel from a single wide film strip. A cut out at each end of the chamber 66 at 38 and 39 could extend to the respective fold lines 54 and 55a to serve as the inlet and outlet openings, in place of the openings 40 and 41.

Figures 13, 14, 15, 16, 18, 19:
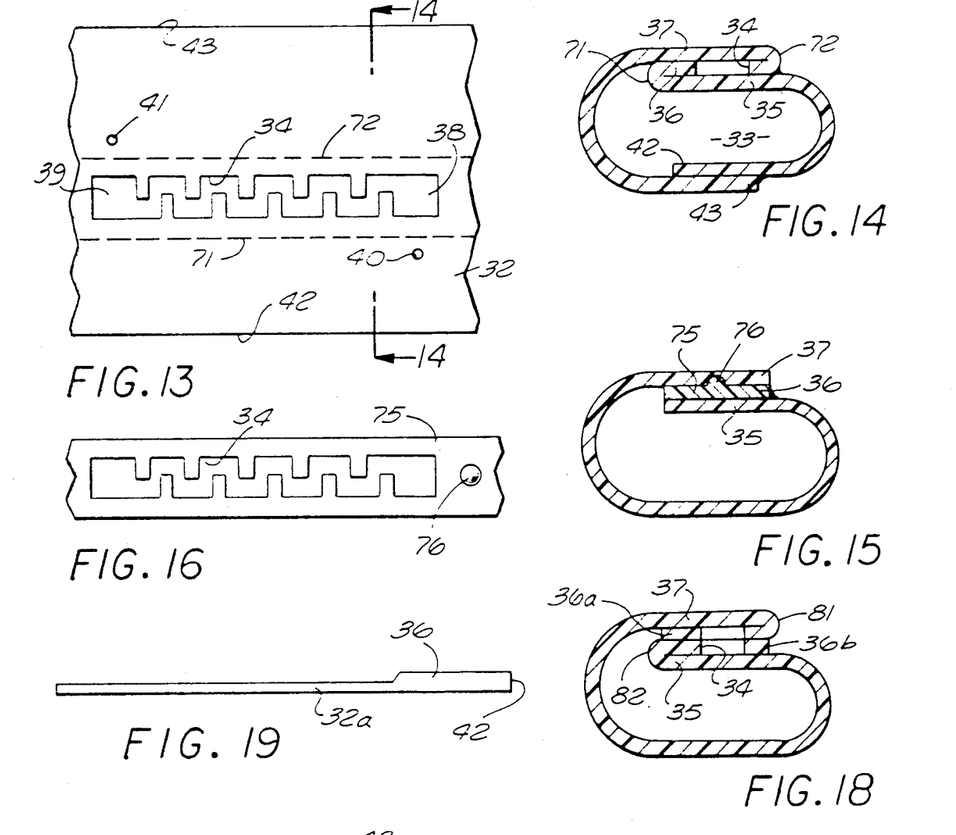
FIG. 13 is a view similar to that of FIG. 4 showing another alternative embodiment of the invention.
FIG. 14 is a cross sectional view of a hose produced from the strip of FIG. 13.
FIG. 15 is a cross sectional view similar to that of FIG. 2 showing an alternative embodiment with a second strip forming the mid layer.
FIG. 16 is a top view of the second strip of FIG. 15.
FIG. 18 is a cross sectional view of a hose formed from the strip of FIG. 17.
FIG. 19 is an end view of a hose forming strip showing an extruded configuration.

In the embodiment illustrated in FIGS. 13, 14, the secondary chamber 34 is formed in the middle of the strip 32, with the strip folded over on opposite sides of the secondary chamber at lines 71, 72 to form the multiple layer section, and with the edges 42, 43 joined together away from the multiple layer section.

In the embodiment of FIGS. 15 and 16, the mid layer of the multiple layer section is formed of a separate strip 75, with the secondary chambers formed in this separate strip. A short length of the separate strip may be used for each secondary chamber, or a continuous separate strip may be utilized with the secondary chambers formed therealong in the same manner as with the strip 32. A locating button 76 maybe formed in the secondary strip 75 if desired. In assembly, the strip 75 is adhered to one edge of the strip 32 and the other edge of the strip 32 is adhered to the strip 75, with the strip 75 serving as the mid layer 36 as shown in FIG. 15.

Figure 17:
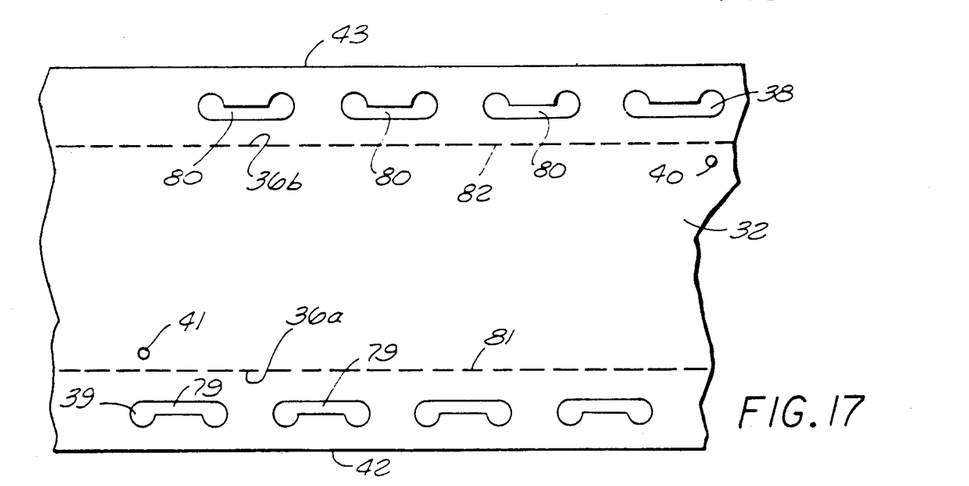
FIG. 17 is a view similar to that of FIG. 4 showing another alternative embodiment of the invention.
Figure 20:
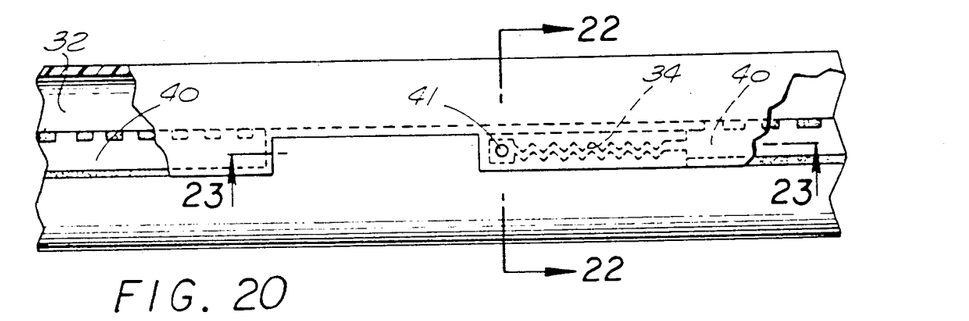
FIG. 20 is a top view of a length of multiple chamber hose, partly broken away, showing another alternative embodiment of the invention.
Figures 21, 22:
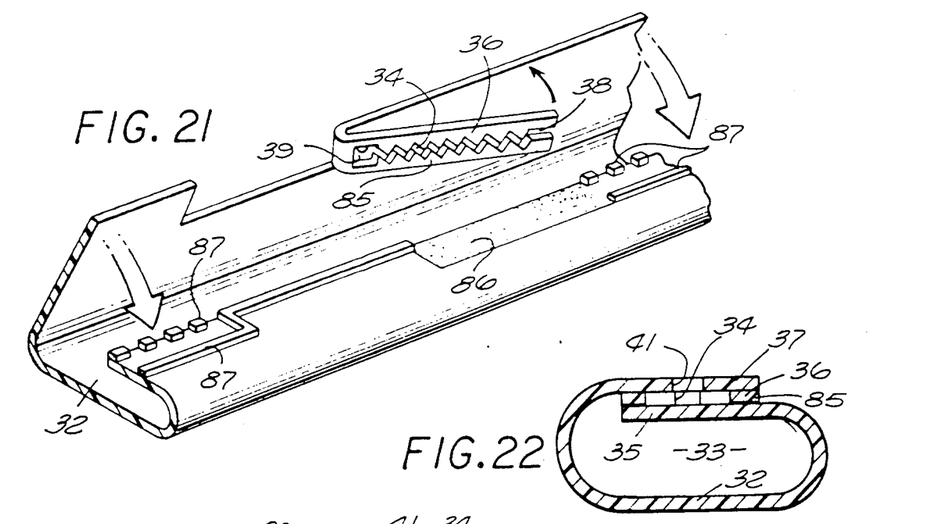
FIG. 21 is a perspective view of the hose of FIG. 20, illustrating the manufacture of the hose.
FIG. 22 is a sectional view taken along the line 22—22 of FIG. 20.
Figure 23:
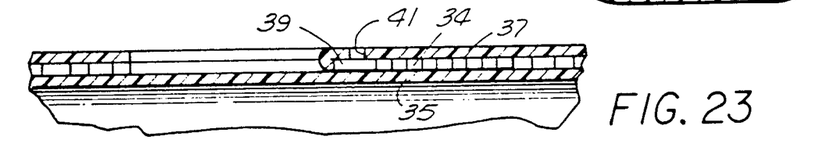
FIG. 23 is a partial sectional view taken along the line 23—23 of FIG. 20.

Another embodiment is shown in FIGS. 17 and 18, with the secondary chamber formed by a plurality of openings 79 along the edge 42 and another plurality of openings 80 along the edge 43, with the ends of opposed openings aligned to provide a continuous secondary chamber when assembled in the configuration of FIG. 18. The edge 42 is folded back on itself along the line 81 and the edge 43 is folded back on itself along the line 82, and the folded over edges are joined together to form the primary chamber and the multiple layer section. In this embodiment, the mid layer of the multiple layer section comprises two layers 36a, 36b, and the secondary chamber alternates between the two sections. In an alternative configuration, the openings 79 could be joined to form a continuous opening and the openings 80 could be joined to form a continuous opening, with a resultant secondary chamber 34 having a double height produced by the double thickness of the strip material comprising the mid layer.

The strip 32 is usually formed with a cross-section of substantially uniform thickness, as is obtained with the conventional blown film or bubble plastic strip manufacturing process. Alternatively, the strip can be produced by extrusion, and in this instance, the thickness of the strip can be varied if it is desired to have one portion of the hose thicker or thinner than another. One such arrangement is shown in FIG. 19 which is an end view of a strip 32a produced by extrusion. This strip is made thicker along the edge 42 which provides the mid layer 36 and can be used when a higher flow rate secondary chamber is desired. Alternatively, the mid layer 36 can be made thinner than the remainder of the strip when a lower flow rate secondary chamber is desired.

Another alternative embodiment is shown in FIGS. 20-23, wherein the mid layer 36 between the primary layer 35 and secondary layer 37 is formed as a flap 85 cut out of the strip of material and folded inwardly. Elements corresponding to those of prior embodiments are identified by the same reference numbers. In manufacture, a thin adhesive film 86 and adhesive beads 87 are applied along the edge of the strip which forms the primary layer 35, typically in the pattern illustrated in FIG. 21. The adhesive film 86 is very thin and serves to hold the flap 85 in place. The adhesive beads are used to form the inlet openings 40. The strip of material utilized for forming the hose typically is in the order of 0.004 to 0.015 inches thick. The adhesive beads should be a bit thicker, and typically with a minimum thickness of 0.007 inches, so that the space formed by the beads between the primary and secondary layers can function as the inlet opening. As with the earlier embodiments, the secondary chamber 34 and the flap 85 may have various configurations, depending on the amount of flow control desired. Also, a flap 57, as shown in FIG. 7, may be used for the outlet opening 41.

Figures 24, 25, 26:
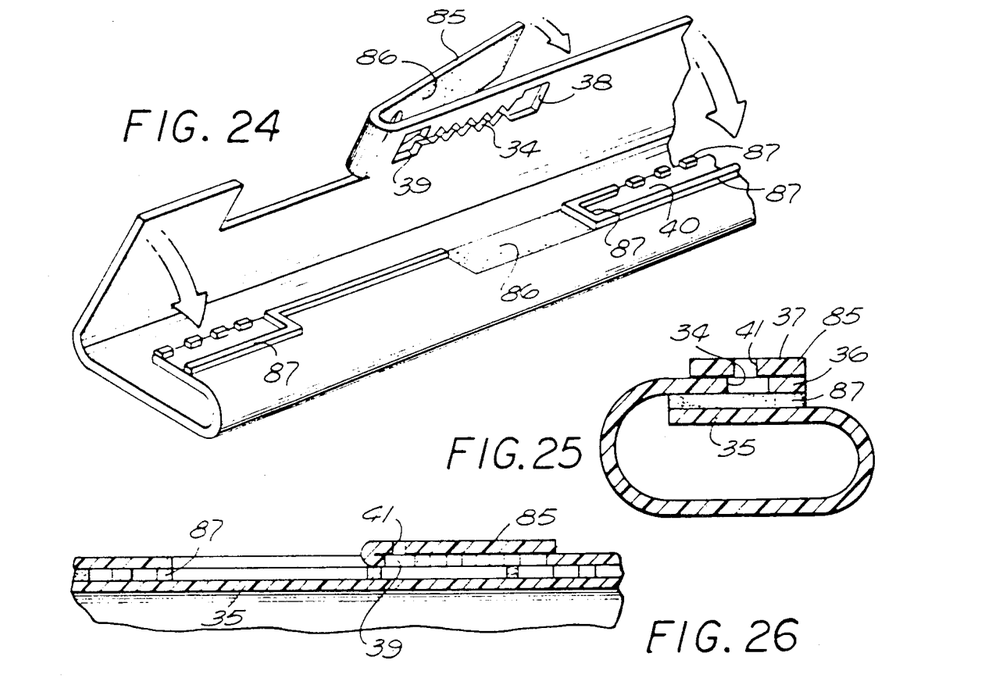
FIGS. 24, 25 and 26 are views corresponding to FIGS. 21,22 and 23, respectively, of another alternative embodiment.

The embodiment of FIGS. 24-26 is similar to that of FIGS. 20-23, with the flap 85 folded to the outside to serve as the secondary layer 37, and with the secondary chamber 34, chamber inlet 38 and chamber outlet 39 formed adjacent to the edge of the strip, which serves as the midlayer 36.

Figures 27, 28, 29:
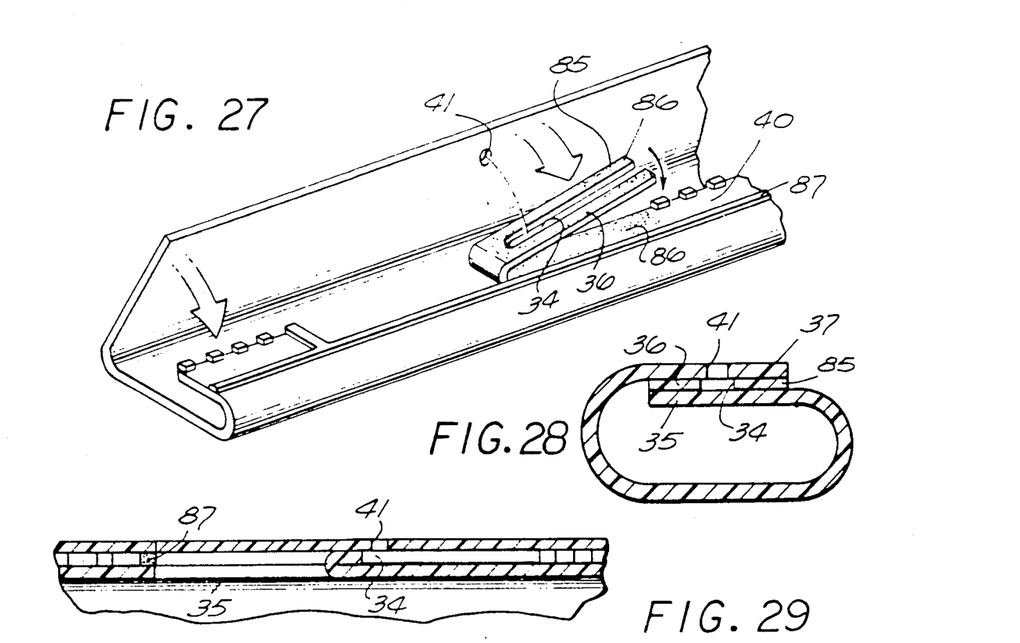
FIGS. 27, 28 and 29 are another set of views corresponding to FIGS. 21, 22 and 23, respectively, of another alternative embodiment.

The embodiment of FIGS. 27-29 is similar to those of FIGS. 20-23 and FIGS. 24-26. In this embodiment, the flap 85 is formed from the opposite edge of the strip, with the flap folded between the edges to serve as the mid-layer 36, with the secondary chamber 34 formed in the flap. The operation of the last three embodiments is the same as that of the earlier embodiments. Water flows through the primary chamber 35 into the inlet opening 40 formed by the adhesive beads, and then into the chamber inlet 38 of the secondary chamber 34. The water flows along the secondary chamber 34 to the chamber outlet 39, and then outward to the area to be irrigated through the outlet opening 41.

I claim:

1. In a multiple chamber hose for drip irrigation, the combination of:
   a primary chamber having a first axis for fluid flow therethrough along said first axis;
   a multiple layer section having a primary layer of material, a mid layer of material and a secondary layer of material;
   with a secondary chamber having a second axis parallel to said first axis and defining a circuitous path formed in said mid layer material for restricting fluid flow through said mid layer along said second axis,
   with said primary, mid and secondary layers formed in a single strip of said material and having opposing edge portions folded toward each other and joined together,
   with said primary layer positioned between said primary chamber and said mid layer and with said secondary layer positioned between said mid layer and the exterior;
   inlet means defining an inlet opening for fluid flow from said primary chamber to said secondary chamber; and
   outlet means defining an outlet opening for fluid flow from said secondary chamber to the exterior.

2. A hose as defined in claim 1 with one of said edge portions folded onto itself and positioned against the other of said edge portions with said secondary chamber formed in said one edge portion.

3. A hose as defined in claim 1 with said inlet means formed as a flap in said primary layer and folded over on said primary layer.

4. A hose as defined in claim 1 with said outlet means formed as a loose flap in said secondary layer.

5. A hose as defined in claim 1 wherein said secondary chamber has alternating offset sections joined by circular sections.

6. A hose as defined in claim 1 with said secondary chamber having a chamber inlet and a chamber outlet, and wherein said mid layer is formed contiguous with one of said primary and secondary layers, and is folded over against said one layer, and has opposing edges and said inlet opening is formed adjacent one of said edges in communication with said chamber inlet, and said outlet opening is formed at said one edge in communication with said chamber outlet.

7. A hose as defined in claim 1 wherein said hose is formed of a strip of material having opposing edges, with said mid layer adjacent one of said edges and folded over on itself to define said primary layer, with the other of said edges overlaying said mid layer to define said secondary layer.

8. A hose as defined in claim 1 wherein said mid layer comprises two layers of material.

9. A hose as defined in claim 1 wherein said multiple layer section includes a flap formed in one of said edge portions and folded back onto said one edge portion, and adhesive means between said primary and secondary layers for spacing said primary and secondary layers and forming said inlet opening, with said secondary chamber formed in said flap.

10. A hose as defined in claim 1 wherein said multiple layer section includes a flap formed in one of said edge portions and folded back onto said one edge portion, and adhesive means between said primary and secondary layers for spacing said primary and secondary layers and forming said inlet opening, with said secondary chamber formed in said one edge portion.

11. A hose as defined in claim 1 wherein said single strip is of substantially uniform thickness.

12. A hose as defined in claim 1 wherein the thickness of said mid layer is different than the thickness of at least one of said primary and secondary layers.

13. In a multiple chamber hose for drip irrigation, the combination of:

a primary chamber for fluid flow therethrough;

a multiple layer section having a primary layer, a mid layer and a secondary layer;

with a secondary chamber defining a circuitous path in said mid layer for restricting fluid flow therethrough, with said primary, mid and secondary layers formed in a single strip having opposing edges folded toward each other and joined together, with said primary layer positioned between said primary chamber and said mid layer and with said secondary layer positioned between said mid layer and the exterior;

inlet means defining an inlet opening for fluid flow from said primary chamber to said secondary chamber; and outlet means defining an outlet opening for fluid flow from said secondary chamber to the exterior, with said edges abutting each other forming said mid layer and defining said secondary chamber.

14. In a multiple chamber hose for drip irrigation, the combination of:

a primary chamber for fluid flow therethrough;

a multiple layer section having a primary layer, a mid layer and a secondary layer;

with a secondary chamber defining a circuitous path in said mid layer for restricting fluid flow therethrough, with said primary, mid and secondary layers formed in a single strip having opposing edge portions folded toward each other and joined together, with said primary layer positioned between said primary chamber and said mid layer and with said secondary layer positioned between said mid layer and the exterior;

inlet means defining an inlet opening for fluid flow from said primary chamber to said secondary chamber; and outlet means defining an outlet opening for fluid flow from said secondary chamber to the exterior, with said hose formed of a strip of material having opposing, with each opposing edge folded over on itself and in abutment with the other opposing edge to form said mid layer, and with at least one of said opposing edges having a cut out pattern defining said secondary chamber when said edges are in abutment.

15. In a multiple chamber hose for drip irrigation, the combination of:

a primary chamber for fluid flow therethrough;

a multiple layer section having a primary layer, a mid layer and a secondary layer;

with a secondary chamber in said mid layer for fluid flow therethrough;

with said primary layer positioned between said primary chamber and said mid layer and with said secondary layer positioned between said mid layer and the exterior;

inlet means defining an inlet opening for fluid flow from said primary chamber to said secondary chamber; and outlet means defining an outlet opening for fluid flow from said secondary chamber to the exterior;

with said hose formed of a strip of material having opposing edges, with said mid layer spaced from said edges, and with said strip folded over both over and under said mid layer to define said primary and secondary layers, respectively, and with said edges joined together spaced from said mid layer to define said primary chamber.

16. In a multiple chamber hose for drip irrigation, the combination of:

a primary chamber for fluid flow therethrough;

a multiple layer section having a primary layer, a mid layer and a secondary layer;

with a secondary chamber in said mid layer for fluid flow therethrough;

with said primary layer positioned between said primary chamber and said mid layer and with said secondary layer positioned between said mid layer and the exterior;

inlet means defining an inlet opening for fluid flow from said primary chamber to said secondary chamber; and outlet means defining an outlet opening for fluid flow from said secondary chamber to the exterior;

with said mid layer comprising two layers of material, and wherein said hose is formed of a strip of material having opposing edges, with one edge folded over on itself to form one of said mid layer layers and said primary layer, and with the other edge folded over on itself to form the other of said mid layer layers and said secondary layer, and with said mid layer layers joined together to form said mid layer.

17. A hose as defined in claim 16 wherein each of said mid layer layers has a plurality of separate openings therein, with the openings of one mid layer overlaying the openings of the other mid layer layer to form said secondary chamber.

18. In a multiple chamber hose for drip irrigation, the combination of:
 a primary chamber for fluid flow therethrough;
 a multiple layer section having a primary layer, a mid layer and a secondary layer;
 with a secondary chamber in said mid layer for fluid flow therethrough;
 with said primary layer positioned between said primary chamber and said mid layer and with said secondary layer positioned between said mid layer and the exterior;
 inlet means defining an inlet opening for fluid flow from said primary chamber to said secondary chamber; and
 outlet means defining an outlet opening for fluid flow from said secondary chamber to the exterior;
 wherein said hose includes a strip of material having opposing edges and said multiple layer section includes a flap formed in one of said edges and folded back onto said one edge, and
 wherein said secondary layer includes said flap.

19. In a multiple chamber hose for drip irrigation, the combination of:
 a primary chamber having a first axis for fluid flow therethrough along said first axis;
 a multiple layer section having a primary layer of material, a mid layer of material and a secondary layer of material;
 with a secondary chamber having a second axis parallel to said first axis and defining a circuitous path formed entirely within said mid layer material for restricting fluid flow through said mid layer along said second axis,
 with said primary, mid and secondary layers formed in a single strip of said material and having opposing edge portions including opposing edges folded toward each other and joined together,
 with said primary layer positioned between said primary chamber and said mid layer and with said secondary layer positioned between said mid layer and the exterior;
 inlet means in said primary layer defining an inlet opening for fluid flow from said primary chamber to said secondary chamber; and
 outlet means in said secondary layer defining an outlet opening for fluid flow only from said secondary chamber to the exterior.

20. A hose as defined in claim 19 with one of said edge portions folded onto itself and positioned against the other of said edge portions with said secondary chamber formed in said one edge portion.

21. A hose as defined in claim 19 with each of said opposing edge portions folded over on itself opposite the other edge portion to form said mid layer, and with at least one of the opposing edges having a cut out pattern defining said secondary chamber when said edges are opposite each other.

* * * * *